United States Patent
Frank et al.

(10) Patent No.: US 7,669,749 B2
(45) Date of Patent: Mar. 2, 2010

(54) METHOD FOR SQUEEZING OFF AND SEALING A TUBE

(75) Inventors: Harald Frank, Giessen (DE); Dan Neis, Oberursel (DE)

(73) Assignee: Stapla Ultraschalltechnik GmbH, Wettenberg (DE)

( * ) Notice: Subject to any disclaimer, the term of this patent is extended or adjusted under 35 U.S.C. 154(b) by 789 days.

(21) Appl. No.: 10/583,741

(22) PCT Filed: Jan. 7, 2005

(86) PCT No.: PCT/EP2005/000088

§ 371 (c)(1),
(2), (4) Date: Jun. 20, 2006

(87) PCT Pub. No.: WO2005/065878

PCT Pub. Date: Jul. 21, 2005

(65) Prior Publication Data

US 2009/0152325 A1    Jun. 18, 2009

(30) Foreign Application Priority Data

Jan. 7, 2004  (DE) .................. 10 2004 001 294
May 5, 2004  (DE) .................. 10 2004 022 509

(51) Int. Cl.
*B23K 20/00* (2006.01)
*B23K 1/06* (2006.01)
*B23K 5/20* (2006.01)
*B23Q 15/00* (2006.01)

(52) U.S. Cl. ............ 228/102; 228/110.1; 228/1.1; 228/9

(58) Field of Classification Search ......... 228/102–104, 228/110.1–111, 1.1, 8–10; 156/73.1–73.4, 156/64, 580.1, 580.2, 358
See application file for complete search history.

(56) References Cited

U.S. PATENT DOCUMENTS

| | | | | |
|---|---|---|---|---|
| 4,468,741 A | * | 8/1984 | Simonton | 700/181 |
| 4,631,685 A | * | 12/1986 | Peter | 700/212 |
| 4,815,001 A | * | 3/1989 | Uthe et al. | 700/212 |
| 5,304,266 A | * | 4/1994 | Becking | 156/64 |

(Continued)

*Primary Examiner*—Kiley Stoner
*Assistant Examiner*—Carlos Gamino
(74) *Attorney, Agent, or Firm*—Dennison, Schultz & MacDonald

(57) ABSTRACT

A procedure for squeezing off and sealing a tube, in which the tube is positioned between a sonotrode and an associated anvil, counter electrode, of an ultrasonic device, and the sonotrode is activated and displaced relative to the counter electrode for squeezing off and sealing the tube. In order to enable automatic squeezing off and sealing of a tube without individually entering the data of the tube into an ultrasonic welding device in advance, the invention proposes positioning the tube and fixing it between the sonotrode and the counter electrode, retrieving stored welding parameters on the basis of the characteristic variable and activating the sonotrode and moving the sonotrode and counter electrode in relation towards each other for consolidating and sealing the tube.

15 Claims, 2 Drawing Sheets

Phase 1  recognize tube diameter
Phase 2  recognize wall thickness
Phase 3  (final)- welding

U.S. PATENT DOCUMENTS

| Patent No. | | Date | Inventor | Class |
|---|---|---|---|---|
| 5,314,105 A | * | 5/1994 | Farassat | 228/102 |
| 5,366,580 A | * | 11/1994 | Czach | 156/359 |
| 5,632,845 A | * | 5/1997 | Stehle et al. | 156/304.2 |
| 5,772,814 A | * | 6/1998 | Grewell | 156/64 |
| 5,855,706 A | * | 1/1999 | Grewell | 156/64 |
| 5,858,142 A | * | 1/1999 | Tully et al. | 156/73.5 |
| 5,911,895 A | * | 6/1999 | Porfido et al. | 219/221 |
| 5,941,443 A | * | 8/1999 | Steiner et al. | 228/1.1 |
| 5,968,297 A | * | 10/1999 | Hooker et al. | 156/64 |
| 6,070,777 A | * | 6/2000 | Patrikios et al. | 228/1.1 |
| 6,427,513 B2 | * | 8/2002 | Gross-Weege et al. | 72/370.08 |
| 6,588,644 B2 | * | 7/2003 | Simon | 228/1.1 |
| 6,942,139 B2 | * | 9/2005 | Lipnevicius | 228/102 |
| 6,979,376 B2 | * | 12/2005 | Nuss | 156/64 |
| 7,491,280 B2 | * | 2/2009 | Gordon, Jr. | 156/64 |
| 2003/0019907 A1 | * | 1/2003 | McGaw, Jr. | 228/1.1 |
| 2005/0218192 A1 | * | 10/2005 | Lovin et al. | 228/113 |

* cited by examiner

Phase 1  recognize tube diameter
Phase 2  recognize wall thickness
Phase 3  (final)- welding

METHOD FOR SQUEEZING OFF AND SEALING A TUBE

The invention refers to a process for squeezing off and sealing a tube, particularly a metal tube intended for example for a cooling device, wherein the tube is positioned between a sonotrode and an associated counter electrode such as an anvil of an ultrasonic welding device and the sonotrode is activated and displaced in relation to the counter electrode for squeezing off and sealing the tube.

Tubes, which are initially evacuated and then filled with a cooling gas, are used for example for metrology and cooling devices and systems. To do so, the tubes are connected to a coupling. After filling, the portion of the tube on the coupling side has to be detached. To achieve this it is required that the tube leading to the system and/or device such as a refrigerator or climate control unit is sealed in a fluid tight manner.

According to the state of the art, consolidating and brazing are well-known. Also an adhesive technology is used, in which the filled tube is closed with a cap, which, in turn, is glued to the tube.

Provided that a fluid-tight sealing results via brazing, the disadvantage arises that, if the tube was not previously consolidated tightly, a funnel develops in the filler metal to be applied, which is interspersed with the gas exiting from the tube, therefore creating a leak. Independently, a corresponding technique may only be used with CFC fluids since they are inflammable.

Today CFC fluids have been mostly replaced with isobutane, which however is highly explosive. Thus, brazing is no longer feasible. Therefore, ultrasonic welding has prevailed, allowing for the consolidation and fluid-tight sealing of a tube, which initially was evacuated and thereafter filled with cooling gas.

With the well-known ultrasonic welding devices for fluid-tight tube sealing, sonotrodes are used, which comprise a first welding surface, followed by an adjacent cutting element. Accordingly, the associated counter electrode—also referred to as an anvil—comprises a second welding surface associated the first welding surface, followed by an adjacent counter-element that is associated with the cutting element, such as an edge.

In a procedure of the type mentioned above according to WO-A-03 07 6116, a section of a tube can be cut without changing tools or repositioning an ultrasonic welding device in that a fluid-tight sealing is achieved, regardless of the side on which the section to be cut is located.

The welding parameters of the ultrasonic welding system have to be set individually as a function of the diameter, wall thickness and material of the tube, for example, in order to enable consolidating and sealing and/or welding to the required extent.

A procedure and device for compacting and subsequently welding electronic conductors is disclosed in EP-B-0 723 713. In order to conduct profile-independent, defined welding, even if different profiles should be welded consecutively in any random order, it is proposed that the conductors inserted into a compression area are first compacted and subsequently a characteristic variable of the compression area accommodating the compacted conductors is determined. On the basis of the characteristic variable, such as the height or width of the compression area, stored welding parameters are retrieved thereafter.

It is the object of the present invention to advance a procedure of the kind mentioned above such that an automated squeezing off and sealing of a tube can be carried out, without previously entering the tube data individually into an ultrasonic welding device.

According to the invention, the following is proposed for solving the problem:
positioning the tube and fixing it between the sonotrode and the counter electrode,
determining at least one characteristic variable of the tube with the tube being fixed between the sonotrode and the counter electrode,
retrieving stored welding parameters based on at least one characteristic variable, and
activating the sonotrode and moving the sonotrode and the counter electrode in relation to one another for consolidating and sealing the tube.

According to the invention, the possibility is created of consolidating and sealing and/or welding tubes in an automated manner by means of an ultrasonic welding device, without the necessity of previously feeding the data required for consolidating and welding to the ultrasonic welding device, therefore sealing the consolidated tube end, in order to subsequently have the welding parameters and pressures available that are required for proper consolidation and welding and/or sealing. Rather, at least one characteristic variable is determined after fixing the tube between the sonotrode and counter electrode in order to automatically have the parameters available for the ultrasonic welding device from data stored on a computer, while taking this variable into consideration, in order to perform proper consolidation and sealing and/or welding of the consolidated tube.

The characteristic variable can be, for example, the outside diameter of the tube, determined from the distance between the sonotrode and the counter electrode, for example by means of a displacement transducer.

However, preferably several characteristic variables are identified. Thus, in addition to the outside diameter, the electrical conductivity of the tube and/or wall thickness may be determined. To this end, the wall thickness can be measured by ultrasound, for example by means of the impulse echo method.

It is also possible, however, to use material properties, such as deformation energy or constriction, as characteristic variables. For example, the sonotrode may be displaced in relation to the counter electrode by means of a defined force or pressure, or vice versa, in order to determine the characteristic variable, to then be able to draw conclusions about the material properties of the tube based on the achieved change in path. During the displacement, ultrasound may be applied to the tube to enable larger changes of path and therefore more precise measurements.

Naturally, it is necessary to previously determine and store a sufficiently large amount of data based on a plurality of measurements conducted on tubes of different dimensions and/or materials, in order to then be able to determine the data associated with a tube during the respective welding process from the obtained tables. In particular welding energy, welding amplitude, welding time and welding pressure are stored in the corresponding tables as welding parameters as a function of the tube diameter and/or wall thickness and/or tube material.

According to the invention, it is proposed for determining the welding parameters to be stored to record one or more control curves taking the temporal changes in energy, force or power of the sonotrode subjected to ultrasonic vibration into consideration in order to determine characteristic variables such as the diameter and/or wall thickness of standard tubes to be consolidated and sealed, to then compare the actual curves of consolidated and sealed tubes with unknown diameters and/or unknown wall thickness to the control curve or curves determined this way, and upon agreement with a control curve to use the welding parameters associated therewith for consolidating and welding the tubes. To this end, the control curve or curves is/are expanded by a tolerance range, into which the actual curves of tubes to be consolidated and sealed are then fitted.

In particular, the invention is characterized in that the control curves are associated with welding parameters such as pressure duration, welding duration or energy input, which are determined for squeezing off and welding standard tubes used during the recordation of the control curves, in that for welding a tube with an unknown size, an actual curve is recorded and the actual curve is fit into one of several control curves, and in that the tube of unknown size is consolidated and welded based on the welding parameters associated with the corresponding control curve.

Additional details, advantages and characteristics of the invention not only result from the claims, the characteristics disclosed in them—either individually and/or in combination—but also from the following description of a preferred embodiment shown in the drawing, wherein:

Figure 1:
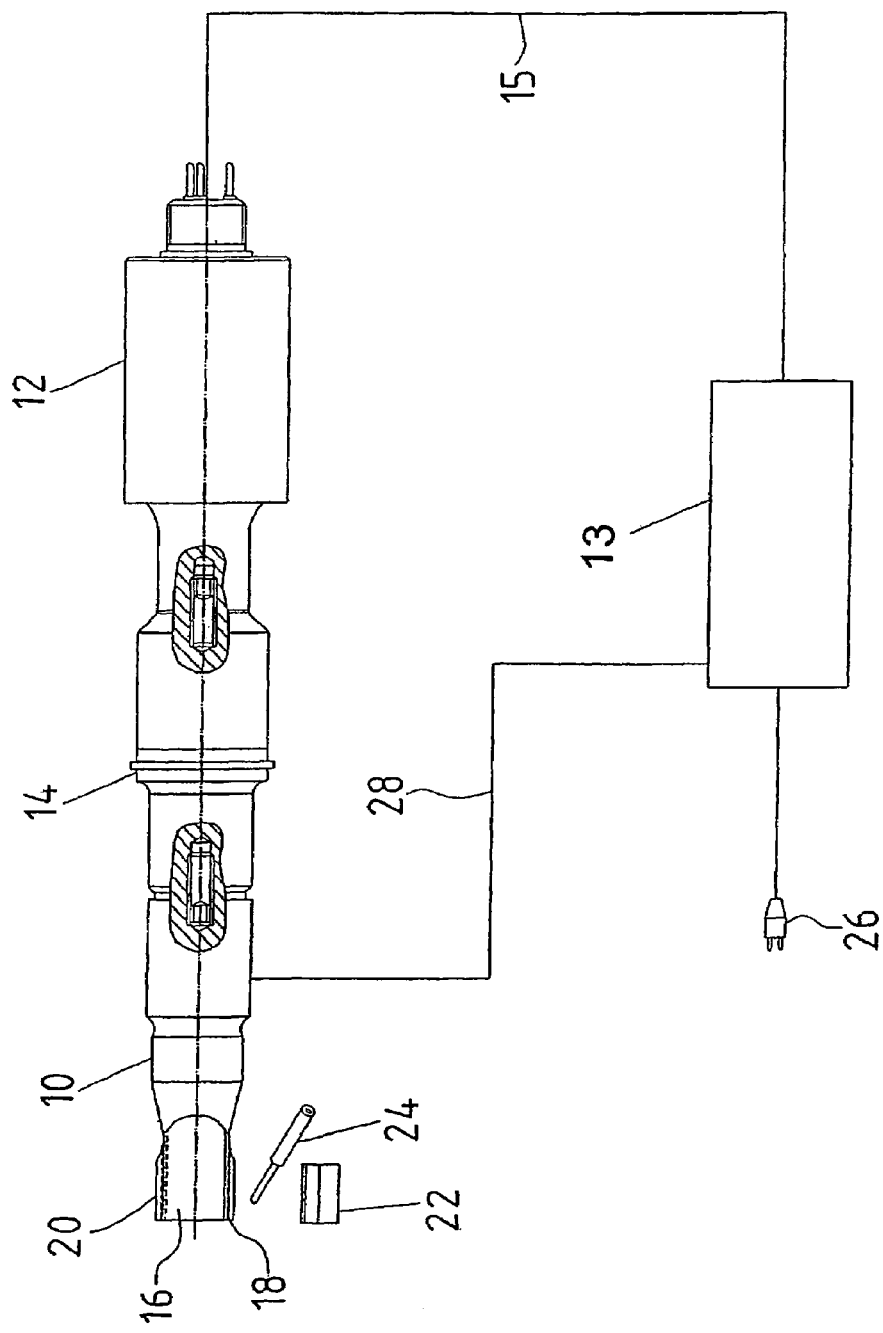
FIG. 1 is a schematic diagram of an ultrasonic welding machine.

FIG. 1 illustrates a schematic construction of an ultrasonic welding machine comprising as essential components a sonotrode 10, a converter 12, as well as a control unit 13. In the embodiment, a booster 14 is arranged between the sonotrode 10 and converter 12, serving as an amplitude transformer to achieve a desired amplitude range and for general stabilization of the vibration behavior inside the vibration system.

The sonotrode 10 comprises a sonotrode head 16 with opposite working or welding areas 18 and 20. In the embodiment, a counter electrode 22, referred to as an anvil, is associated with the working or welding area 18, between which an electrode, for example, a tube made of copper 24 is arranged in order to consolidate and seal it, i.e. to weld it. At the same time, where required, the tube may be cut on one side. For this, the sonotrode head 16 and/or the working areas 18, 20, as well as the counter electrode 22, are associated with cutting edges in order to shear off the tube section.

The control unit 13 is fed a system voltage by means of a connection 26, the frequency of which is converted to 20 kHz, for example. Thereafter, the converter 12 converts the electric energy into mechanical vibration energy, whereby the mechanical vibration frequency corresponds to the electrical frequency of the control unit 14. The booster 14 interposed between the sonotrode 10 and converter 12 serves, as previously mentioned, for the amplitude transformation between the converter 12 and sonotrode 10. The control unit 13 is connected to the converter 12 by means of a control line 15.

The quality of squeezing off and sealing the tube 24 is dependent on the amplitude of the sonotrode head 16, the welding pressure (operating pressure), the welding energy, the compression, as well as the welding time. According to the state of the art, the corresponding data is entered individually into the control unit 13 as a function of the outside diameter, wall thickness and material of the tube 24, in order to then conduct the squeezing off and welding process and where applicable the cutting of the tube section by means of interaction between the sonotrode head 16 and anvil or counter electrode 22. According to the invention, it is now proposed that the control unit 13 and/or a computer, which is not shown, stores a multitude of welding parameters, comprising, for example, the amplitude of the sonotrode 10 and/or working area 18, 20, the welding pressure, the energy and the welding time, as well as the compression, as a function of the tubes to be consolidated and welded, meaning their diameters, wall thickness and materials, to mention a few characteristic variables by way of example.

After the tube 24 to be welded has been arranged between the anvil (second or counter electrode 22) and the first working area 18 of the sonotrode 10, and the sonotrode 10 has thereafter been lowered in the direction of the anvil or second electrode 22, namely the anvil, until the tube 24 is fixed between the sonotrode 10 and the second electrode 22, the distance between the sonotrode 10 and counter electrode 22 is determined in order to obtain the outside diameter of the tube 24. The distance may be recorded by means of a displacement transducer, whereby the corresponding data is fed to the control unit 13 and/or the computer via a data line 28. In addition, characteristic material properties of the tube 24 can be determined and fed to the control unit 13 and/or the computer also by means of the data line 28. Stability, electrical resistance or wall thickness, for example, are considered characteristic material values, which are determined after fixing the tube 24 between the sonotrode 10 and counter electrode 22 and/or their welding areas. Stability may be determined in that, after fixing the tube 24, the sonotrode 10 is displaced in the direction of the counter electrode 22 with a defined pressure. As a function of the displacement path, conclusions may be drawn about the material of tube 24. The electrical resistance of the tube 24 may be determined as well. With a sensor that is present, for example, in the area of the second counter electrode 22, the wall thickness of the tube 24 can be measured by means of ultrasound. Other suitable measuring methods are feasible as well.

Independently thereof, parameters stored in the control unit 13 and/or computer on the basis of the characteristic variable of the tube 24 determined as described above by way of example, which parameters comprise, in particular, the amplitude of the sonotrode 10, the welding pressure, welding energy, compression and welding time, are retrieved in order to activate the sonotrode 10 accordingly and/or to displace it in the direction of the second or counter electrode 22, i.e. the anvil. The tube 24 is then consolidated to the required extent and sealed, i.e. welded. Shearing of the non-required tube section may be carried out at the same time.

Figure 2:
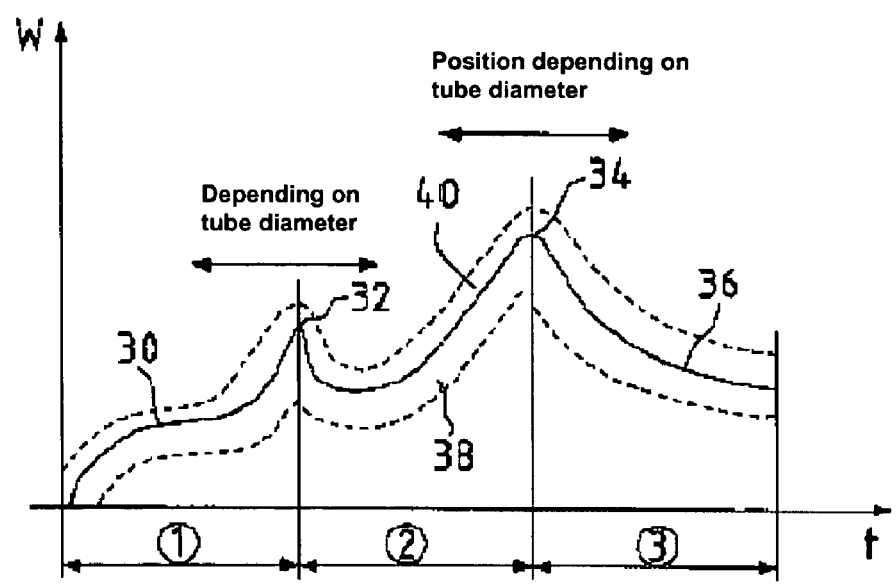
FIG. 2 is a performance time diagram.

FIG. 2 illustrates, based on a power/time diagram, how characteristic parameters can be determined from a deformation curve and, consequently, the consolidation and welding of tubes may be automated.

In FIG. 2, the power W is reflected in relation to the time t for the determination of a control curve of a known tube with a defined diameter and a defined wall thickness. The curve 30 exhibits two characteristic peaks 32, 34, whereby the first peak 32 occurs when the sonotrode 10 is lowered in the direction of the counter electrode 22 such that a standard tube to be measured is fixed between them, i.e. the outside diameter can be determined. The position of the first peak 32 depends on the tube diameter. During further lowering and/or relative movements of the sonotrode 10 towards the counter electrode 22, the power increase rises following an initial decline, in order to pass through the second peak 34. The position of the second peak 34 depends on the wall thickness of the tube. Thereafter, the consolidation and sealing of the tube take place. In relation to the power, this is illustrated by a decreasing curve section 36.

Corresponding to the power/time curves 30, also referred to as standard curves, a multitude of tubes with different diameters and wall thicknesses is now included. Then a tolerance range 38, 40 is assigned to the respective standard curve.

If tubes of unknown diameter and wall thickness are now to be consolidated and sealed, an actual curve is recorded and fitted into a standard curve.

When using the corresponding control curve as a basis, the welding parameters such as pressure, welding duration or energy input are thereafter retrieved from the stored tables in order to be able to properly consolidate and seal the tube of unknown diameter and wall thickness.

In other words, first a learning mode is carried out, in order to record control curves corresponding to the curve 30 for varying tube diameters of, for example, 4, 6, 8, 12 mm and different wall thickness levels of, for example, 0.6 mm-1 mm, and then determine and store a tolerance range. Thereafter, a tube of unknown diameter and wall thickness is positioned between the sonotrode 10 and counter electrode 22, the sonotrode 10 and counter electrode 22 are moved towards each other in order to then determine the tube diameter and wall thickness on the basis of the peaks occurring in the actual curve and compare the corresponding values to the values of the control curves. Should corresponding values exist in a control curve, the remaining parameters required for proper consolidation and sealing are then retrieved (welding mode).

The invention claimed is:

1. A procedure for squeezing off and sealing a metal tube, comprising the steps of:
    positioning and fixing the tube between a sonotrode and associated counter electrode of an ultrasonic welding device;
    determining a characteristic variable of the tube with the tube being fixed between the sonotrode and counter electrode;
    retrieving stored welding parameters on the basis of the characteristic variable; and
    activating the sonotrode and moving the sonotrode and counter electrode in relation to each other for squeezing off and sealing the tube.

2. A procedure pursuant to claim 1, wherein a distance between the sonotrode and counter electrode with the tube fixed between them is determined as a characteristic variable.

3. A procedure pursuant to claim 1, wherein electrical conductivity of the tube is determined as a characteristic variable.

4. A procedure pursuant to claim 1, wherein wall thickness of the tube is determined as a characteristic variable.

5. A procedure pursuant to claim 1, wherein deformation level of the tube is determined as a characteristic variable.

6. A procedure pursuant to claim 5, wherein for determining the deformation level, pressure to be applied for displacing the sonotrode and counter electrode towards each other across a defined distance is measured.

7. A procedure pursuant to claim 6, wherein during the displacement of the sonotrode toward the counter electrode, the sonotrode is activated by means of ultrasound.

8. A procedure pursuant to claim 4, wherein the wall thickness is determined by means of ultrasound.

9. A procedure pursuant to claim 1, wherein multiple characteristic variables are determined and, based thereon, stored welding parameters are retrieved.

10. A procedure pursuant to claim 1, wherein following the consolidation and sealing of the tube, one section of the tube is cut.

11. A procedure pursuant to claim 1, wherein for determining welding parameters to be stored, at least one control curve taking into consideration temporal change of energy, force and/or power of the sonotrode subjected to ultrasonic vibration is recorded during the determination of characteristic variables, the control curves are compared to actual curves of tubes with unknown diameter and/or unknown wall thickness to be squeezed off and sealed, and, while taking into consideration potentially defined tolerances in event of an agreement between the actual curves and at least one said control curve, the welding parameters associated with the at least one said control curve are used for squeezing off and welding the tube.

12. A procedure pursuant to claim 11, wherein the actual curve is compared to the at least one control curve expanded by a tolerance range.

13. A procedure pursuant to claim 11, wherein the control curve is associated with a welding parameter which is determined for squeezing off and welding standard tubes used during the recordation of the control curves, an actual curve is recorded for welding a tube with unknown size, and the actual curve is fitted into one of several control curves and thus, the tube with unknown size is squeezed off and welded on the basis of welding parameters associated with a corresponding control curve.

14. A procedure pursuant to claim 11, wherein at least one of diameter and wall thickness of standard tubes to be squeezed off and sealed is determined as a characteristic variable.

15. A procedure pursuant to claim 13, wherein the welding parameter associated with the control curve is least one of pressure, welding duration and energy input.

* * * * *